(12) United States Patent
Tidd (10) Patent No.: US 7,929,762 B2
(45) Date of Patent: Apr. 19, 2011

(54) DETERMINING EDGELESS AREAS IN A DIGITAL IMAGE

(76) Inventor: Jeffrey Kimball Tidd, Sandy, UT (US)

( * ) Notice: Subject to any disclaimer, the term of this patent is extended or adjusted under 35 U.S.C. 154(b) by 1015 days.

(21) Appl. No.: 11/684,714

(22) Filed: Mar. 12, 2007

(65) Prior Publication Data
US 2008/0226161 A1   Sep. 18, 2008

(51) Int. Cl.
*G06K 9/34* (2006.01)
(52) U.S. Cl. .................................................. 382/173
(58) Field of Classification Search ........... 382/173–180
See application file for complete search history.

(56) References Cited

U.S. PATENT DOCUMENTS

| | | | | |
|---|---|---|---|---|
| 5,268,967 A * | 12/1993 | Jang et al. | ................. | 382/132 |
| 5,586,200 A * | 12/1996 | Devaney et al. | ........... | 382/232 |
| 6,185,320 B1 * | 2/2001 | Bick et al. | ................... | 382/132 |
| 6,591,004 B1 * | 7/2003 | VanEssen et al. | ............. | 382/154 |
| 6,647,132 B1 * | 11/2003 | Montillo et al. | ............. | 382/108 |
| 6,711,278 B1 * | 3/2004 | Gu et al. | ..................... | 382/103 |
| 7,031,517 B1 * | 4/2006 | Le et al. | ...................... | 382/173 |
| 7,043,290 B2 * | 5/2006 | Young et al. | ................. | 600/416 |
| 7,158,692 B2 * | 1/2007 | Chalana et al. | ............... | 382/294 |
| 7,162,055 B2 * | 1/2007 | Gu et al. | ..................... | 382/103 |
| 7,187,800 B2 * | 3/2007 | Hibbard | ...................... | 382/173 |
| 7,212,670 B1 * | 5/2007 | Rousselle et al. | ............ | 382/173 |
| 7,327,880 B2 * | 2/2008 | Tek | ................................ | 382/173 |
| 7,349,573 B2 * | 3/2008 | Porikli | ......................... | 382/164 |
| 7,400,770 B2 * | 7/2008 | Keaton et al. | ................ | 382/191 |
| 7,460,709 B2 * | 12/2008 | Grady | .......................... | 382/180 |
| 7,736,313 B2 * | 6/2010 | Luo et al. | ..................... | 600/437 |
| 7,756,316 B2 * | 7/2010 | Odry et al. | .................... | 382/131 |
| 7,760,941 B2 * | 7/2010 | Bornemann et al. | ......... | 382/173 |
| 2001/0048753 A1 * | 12/2001 | Lee et al. | ..................... | 382/103 |
| 2002/0164061 A1 * | 11/2002 | Paik et al. | ..................... | 382/131 |
| 2003/0174872 A1 * | 9/2003 | Chalana et al. | ............... | 382/128 |
| 2004/0022438 A1 * | 2/2004 | Hibbard | ........................ | 382/199 |
| 2005/0100220 A1 * | 5/2005 | Keaton et al. | ................. | 382/191 |
| 2005/0163375 A1 * | 7/2005 | Grady | .......................... | 382/180 |
| 2005/0201618 A1 * | 9/2005 | Tek | ................................ | 382/173 |
| 2005/0207630 A1 * | 9/2005 | Chan et al. | .................... | 382/131 |
| 2005/0213816 A1 * | 9/2005 | Porikli | ......................... | 382/173 |
| 2006/0159343 A1 * | 7/2006 | Grady | .......................... | 382/180 |
| 2006/0280351 A1 * | 12/2006 | Luping et al. | ................. | 382/128 |
| 2007/0217668 A1 * | 9/2007 | Bornemann et al. | ......... | 382/132 |
| 2008/0226161 A1 * | 9/2008 | Tidd | .............................. | 382/162 |
| 2008/0267498 A1 * | 10/2008 | Shaw et al. | .................... | 382/173 |
| 2008/0279478 A1 * | 11/2008 | Tsoupko-Sitnikov et al. | ............................ | 382/298 |

OTHER PUBLICATIONS

Shih et al., "Automatic Seeded Region Growing for Color Image Segmentation", Image and Vision Computing, vol. 23, Issue 10, pp. 877-886, Sep. 2005.*

* cited by examiner

*Primary Examiner* — Aaron W Carter
(74) *Attorney, Agent, or Firm* — Daniel S. Coolidge (57) ABSTRACT

A computer program product and method for locating edgeless areas within digital images, by locating a pixel with a luminance value that does not vary from its major neighbors by more than a fixed tolerance, and seeking to expand an edgeless area about such pixel by examining the variance in luminance of pixels about the selected pixel and if within a preset tolerance, including such neighbors within an edgeless area, and optionally further including pixels otherwise not includable within the edgeless area if local variations in luminance suggest a noisy background for which the tolerance may be increased.

4 Claims, 8 Drawing Sheets

DETERMINING EDGELESS AREAS IN A DIGITAL IMAGE

TECHNICAL FIELD

This invention relates to digital image processing, and more particularly to locating edgeless areas within an digital image.

BACKGROUND

Digital images are made up of individual picture elements (pixels) each of which may contain information regarding color, hue, intensity and location. Gray scale images contain pixels with luminosity values. For example, eight bit gray scale image pixels can have luminosity values from zero to 255.

Digital image images may be processed to extract useful information. For example, it is well known in the art to scan a text document and process the scanned image for text and to recognize the text characters and convert the image into a text document. It is also known in the art to separate text areas in a scanned image from pictures and graphical elements.

Sometimes, however, a scanned image presents significant problems for a computer to determine where a desired feature is because of low contrast or noise in the image. Various methods are known in the art to enhance digital images, such as by contrast enhancement or sharpening. Many digital imaging processing techniques look for edges of objects within an image. It is often as useful to know where edges are not present so as to limit further image processing to areas in which edges of objects within the image filed may in fact be present.

What is needed is a reliable method of determining edgeless areas in a digital image.

BRIEF SUMMARY

In an embodiment, the invention includes a method for locating edgeless areas within digital images by locating a pixel with a luminance value that does not vary from its major neighbors by more than a fixed tolerance, and seeking to expand an edgeless area about such pixel by examining the variance in luminance of pixels about the selected pixel and if within a preset tolerance, including such neighbors within an edgeless area, and optionally further including pixels otherwise not includable within the edgeless area if local variations in luminance suggest a noisy background for which the tolerance may be increased.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

In processing digital images, it is often desirable to detect the edges of edges of some object within the image, such as a building or text. It is often as desirable to know where edges are not shown in an image-defined as "edgeless areas". For example, knowing the edgeless areas in an image may serve to limit image processing for edges.

A digital image is typically represented by picture elements, or "pixels" which are defined for purposes of this disclosure as the smallest element of data in a particular digital image. Pixels in any specific image relate to the granularity of the image: the more pixels per unit length in the area represented by the image, the greater the resolution. However, the granularity or pixel density of the image does not affect the image processing described in this disclosure, other than to limit the resolution of the image data. For purposes of this disclosure, we use text detection as an example, for which favorable results have been achieved at a resolution of 150 dots per inch or dpi. Pixel and dot are here used interchangeably.) For other applications, greater or lesser pixel densities may be chosen.

The present invention relates to detecting and expanding contiguous regions of pixels that have no discernable edge between them, or "edgeless areas". These edgeless areas are determined by selecting a pixel, P1, and then pixel-by-pixel using data collected within a specified number of pixels from P1. (In a 150 dpi image of text, this might be within 0.2" of P1.

Application of the present invention presumes that on one side of an imaged edge there is a contiguous region of edgeless pixels that have characteristics that may be discovered in a three step process. Application of the present invention also explores data surrounding a potential edge pixel to find a contiguous set of pixels that have characteristics sufficient distinct from the edgeless area to consider the pixel in question to be part of an edge.

Figure 1:
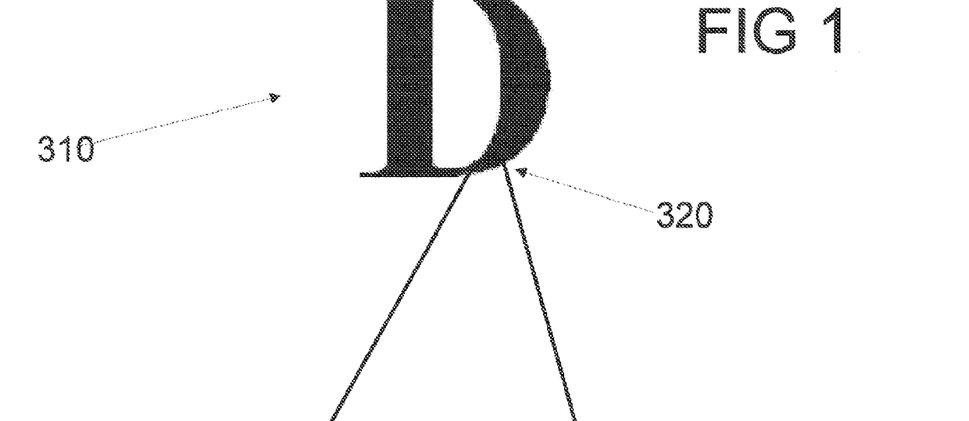
FIG. 1 is a drawing of a digitally represented text character.
Figure 1A:
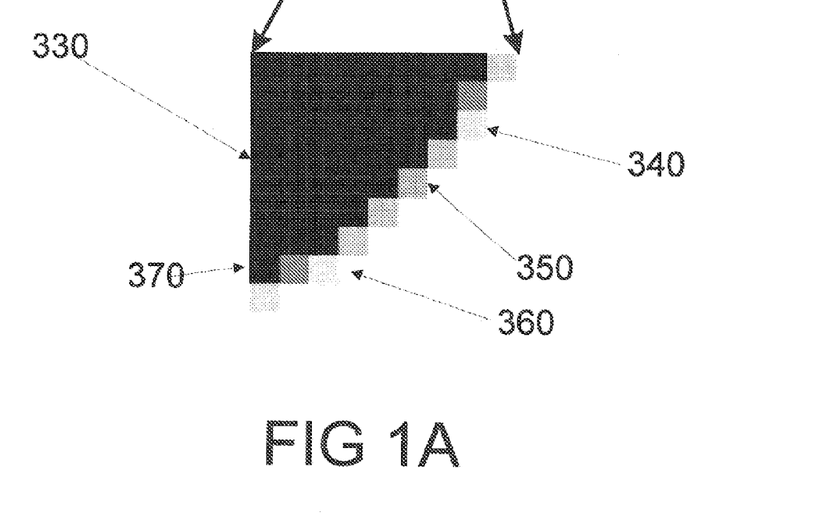
FIG. 1A is an expanded view of a portion of the digitally imaged text character.

Referring to FIG. 1, a digital image 310 of a letter "D" is shown. Expanding an area 320 on the lower curve of the "D" gives an expanded view in FIG. 1A. The expanded portion 330 in FIG. 1A shows low a low luminosity pixel 340, a medium luminosity pixel 350, a very high (white) luminosity pixel 360 and a zero luminosity (black) pixel 370. The boundary between the character (zero luminosity) and background (very high luminosity—white) is visually clear both to human perception and to a computer.

Figures 2, 2A:
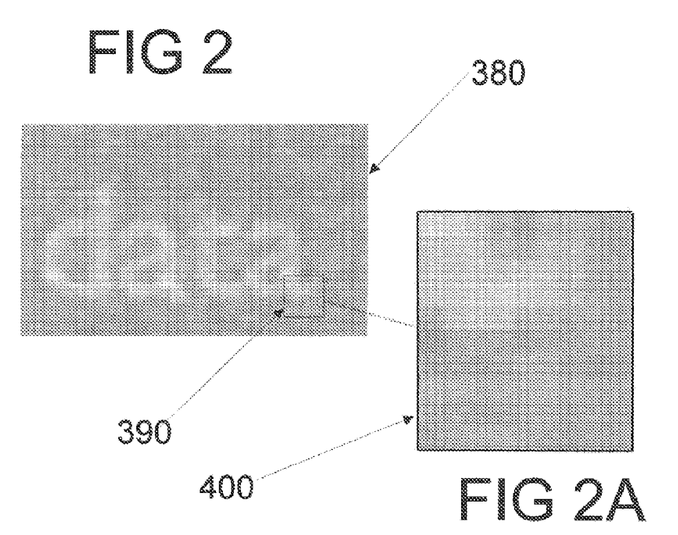
FIG. 2 is a portion of an unprocessed digital image containing lettering against a noisy background.
FIG. 2A is a an expanded view of portion of a letter.

FIG. 2 shows an example digital image 380 which has low contrast between the obvious letters spelling the word "data" and the background. A small area 390 is expanded in FIG. 2A 400 to show how unclear a pixel by pixel interpretation is to the human eye, and much more so to computer analysis.

Figures 3, 3A:
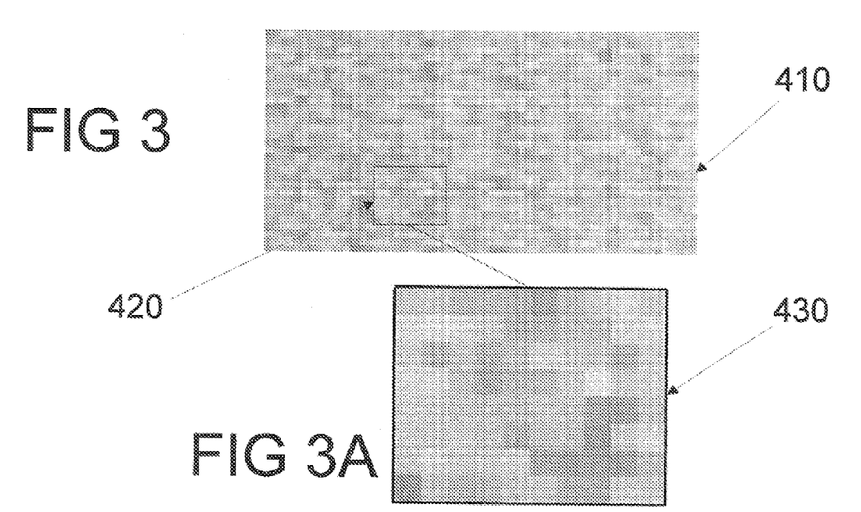
FIG. 3 is a digital image containing no edges or features.
FIG. 3A is an expanded view of a portion of the featureless digital image.

FIG. 3 shows a digital image 410 of an area with no discernable information—no characters or edges are perceivable, nor indeed, are they there. FIG. 3A expands a portion 420 of the edge-free image 410. The expanded portion 430 looks visually similar to the edge containing portion 400 in FIG. 2A. It would be useful to have a means of determining the truly featureless portions of FIG. 3A from those portions which may have interesting information susceptible to further image processing.

Figure 4:
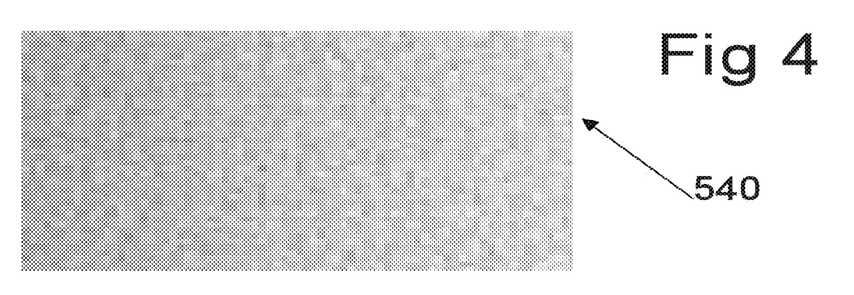
FIGS. 4, 4A and 4B are representations of a noisy background with no edges before processing, after processing by the First Inclusion Rule, and after processing by the Second Inclusion Rule, respectively.
Figure 4A:
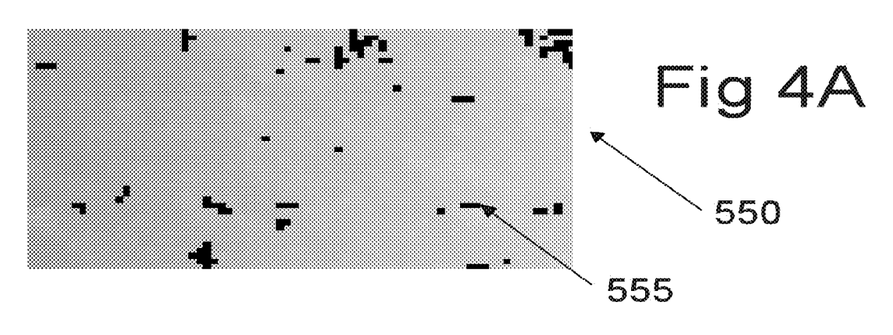

The present invention relates to the application of one and, optionally, two processes for identifying edgeless portions of a digital image. Before describing the process itself, it is useful to see what the process accomplishes on sample images. FIG. 4 shows a portion of a digital image 440 showing a letter "F" 450 on which image no processing has been performed. Referring to FIG. 4A, and having applied the first rule of the present invention 460 yields a number of background pixels 470 in which the uniformly light grey portions 470 of the image have been determined to be edgeless. In this example, a single pixel 480 has not been shown by application of the first step of the invention to be in an edgeless area. Applying the second step of the present invention yields the image 490 in FIG. 4B. Note that the pixel 480 in FIG. 4A has now been included in the edgeless areas. (Note too we are not seeking to increase the "readability" of the text containing portion of the image; rather we are seeking here only to determine which areas are in fact edgeless.)

Figure 4B:
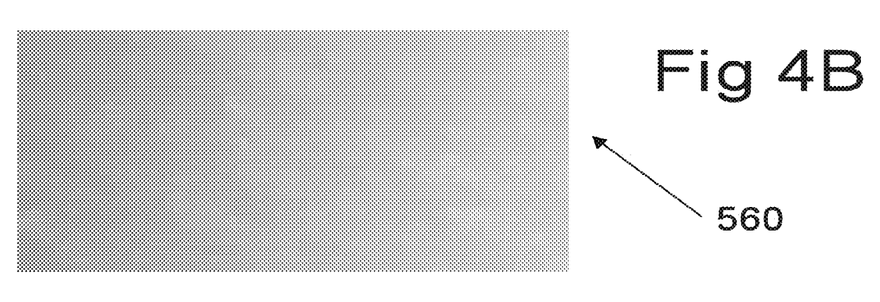

In FIGS. 4, 4A and 4B we see the unprocessed image 540 contains noisy data with no visible text or edges. Applying the first inclusion rule yields the image 550 shown in FIG. 6A. Many, but not all of the background pixels have been shown to be within the edgeless area. Various pixels (shown in black) have not been shown yet to be in an edgeless area. Applying the second inclusion rule (the results of which are shown in FIG. 6B) cleans up all remaining pixels, i.e. all pixels are now seen as being in an edgeless area.

We look now to the methodology rather than the results of applying the principles of the present invention. For purposes of example, let us assume a grayscale image where each pixel has a value between 0 and 255, the value representing luminosity. Application of the present invention does not require eight bit luminosity gray scale—it is used merely by way of example. The present invention is equally applicable to other ranges of luminosity values. The pixel density is not important for purposes of application of the principles of the present invention, but we will use by way of example 150 dots per inch. The values of various parameters discovered by experimentation will be different for different resolutions and ranges of grey scale.

The recommended tolerances given herein were determined experimentally for the purpose of detecting visible edges in a 150 dpi image. If the image being processed were 300 dpi instead of 150, then there would be 4 times as many pixels per surface area. In other words, it takes 4 pixels at 300 dpi to have the same visual impact as 1 pixel in a 150 dpi image. Tolerances would need to be adjusted accordingly.

Application of the principles of the present invention may involve a one or two step process: first, (i) locate pixels in potential "edgeless" areas using the "Start Rule" described below and expand the discovered potentially edgeless pixels by testing neighboring pixels for inclusion using the First Inclusion Rule described below, and repeating this overall process until all the pixels in the image have been examined. Optionally, the edgeless areas so far discovered may be further expanded by using the Second Inclusion Rule described below.

We search all of the pixels in an image not already in an edgeless area. At the beginning, none of the pixels have been found to be in an edgeless area. Accordingly, we apply a start process (Start Rule) to locate a pixel within a scanned image that appears to be a candidate for being within an edgeless area. We use a tolerance SR_T1 which will find a pixel being examined and its eight neighbors are visually of the same luminance. Small differences in luminance values are not visually noticeable and can be treated as flat. In our example image, we have found a value of 14 for SR_T1 works well.

Figure 5:
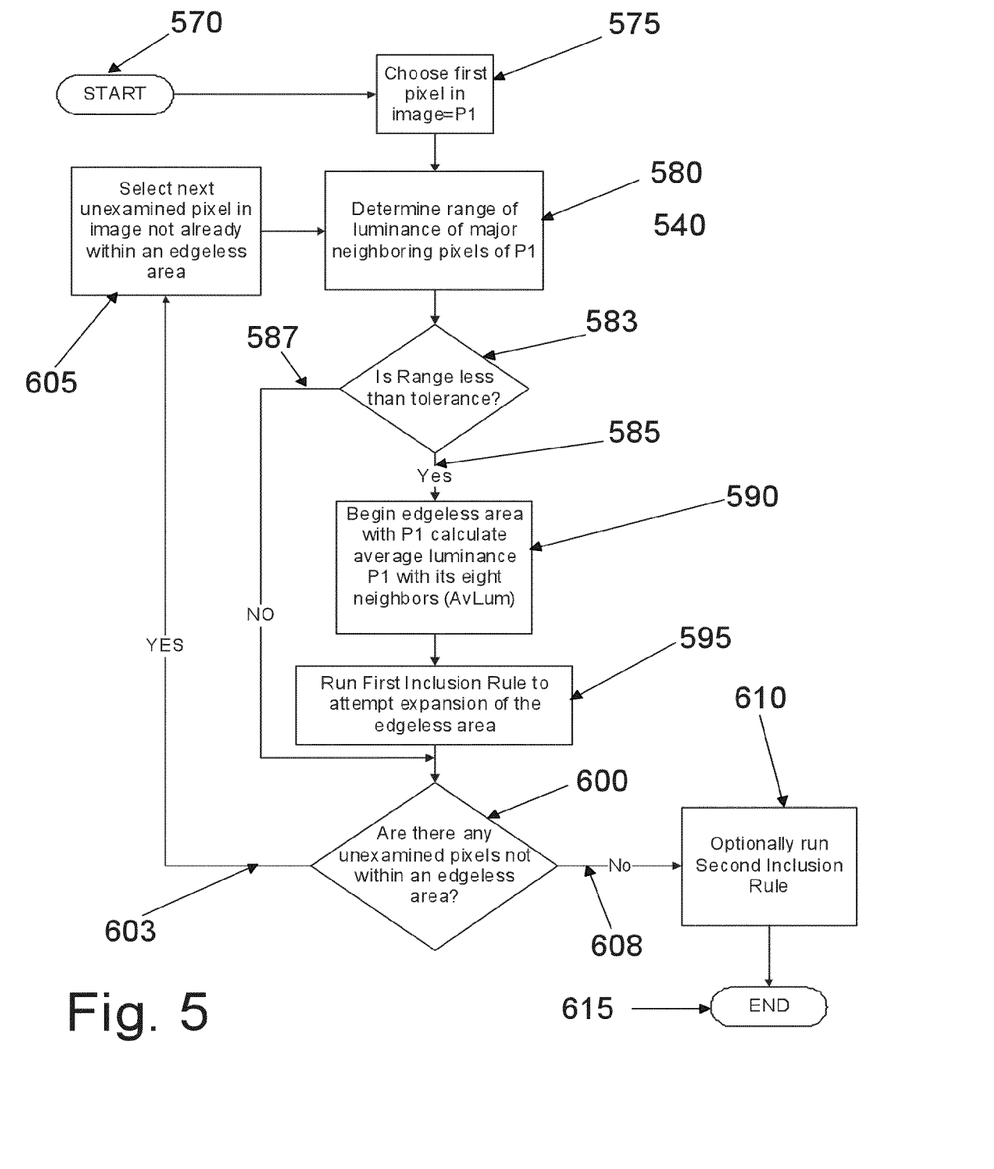
FIG. 5 is a flowchart of one embodiment of a Start Rule and overall process.

Referring to FIG. 5, one embodiment according to the principles of the present invention of a start rule is shown in a flowchart. Beginning at the start 570, we chose 575 a pixel P1 from an array of pixels comprising the image. This array need not be rectilinear or other shape. It is unimportant which pixel is initially chosen as the first pixel, provided that ultimately all pixels will be examined. For any pixel P1 in the digital image, 580 record the highest luminance neighbor of the eight neighboring pixels (hilum) and the lowest luminance neighbor (lolum). If the difference (hilum–lolum) is less than SR_T1 585 then P1 is determined to be in a potentially edgeless area.

If the range is not less than SR_T1 587, and if there are more unexamined pixels remaining in the image that have not already been included in an edgeless area 603, choose a next pixel from these unexamined pixels 605 and repeat the above process 580.

If there are no further unexamined pixels not within an edgeless area 608, then we may optionally run the second inclusion rule 610. Upon either skipping the second inclusion 610 rule or completing it, we are done 615.

If the range is less than the tolerance value SR_T1 585 we then determine the average luminance for P1 590 by averaging the luminance values of P1 and the surrounding eight pixels. (Edge pixels and corner pixels may have fewer than eight neighbors.) We then see if the potential edgeless area may be expanded 595 by running the first inclusion rule 595.

Having found a candidate for an edgeless area, we seek to expand the edgeless area around the candidate pixel. It is useful to consider it as starting with a candidate pixel and expanding a "cloud" of similar pixels around the starting pixel. The cloud need not be rectilinear at all—it merely needs to be made up of pixels whose luminance values are sufficiently similar to preclude an edge being within the cloud. (Clearly, the ability to distinguish an edge is related to the resolution of the image.)

We define "immediate neighbor" as meaning any of the eight immediately surrounding pixels, and "major neighbor" as meaning a neighbor immediately above, below, left or right of a particular pixel.

AcLum is defined as the actual luminance of a pixel.

AvLum is defined as a local average of pixels belonging to the same edgeless area in the Start Rule, AvLum was calculated by averaging the AcLums of a pixel and its 8 immediate (i.e. surrounding) neighbors. For pixel p2 added to an edgeless area using Inclusion Rule 1, AvLum is calculated as follows:

1. Sum the AvLums of all major neighbors of P2 already belonging to an edgeless area.
2. Add the AcLum of P2 to this sum.
3. Divide the result by the number of pixels in the sum.

Using the AvLums of the neighbors (instead of AcLums) has the effect of limiting or smoothing changes in luminance as the edgeless area is expanded.

P2 as used herein refers to a pixel outside of but contiguous to an edgeless area, which pixel is being considered for inclusion in the edgeless area.

P1 is defined as a major neighbor of P2 that belongs to an edgeless area.

Certain tolerances are used during application of the First Inclusion Rule, These were experimentally determined for scanned images of 150 dpi, 8 bit grayscale images. For other resolutions and ranges of luminance values, the tolerances will require to be adjusted accordingly.

The first tolerance used in Inclusion Rule 1 (IR1_T1) provides a quick way to add pixels to the edgeless area that are so close to the AvLum of the edgeless area (locally) that there could be no edge at this location. Small differences in luminance values are not visually noticeable and can be treated as flat. We use a more conservative value than SR_T1 because mostly we want to rely on the more sophisticated algorithms in Inclusion Rule 1. This simple tolerance is prone to cumulative errors if the value is too large. We have found a value of 6 works well.

A second tolerance value for Inclusion Rule 1 is IR1_T2 which is used to look for pixels that are sufficiently lighter or darker than the edgeless area AvLum. Having already tested by IR1_T1, it assures that we don't look at pixels that are roughly the same luminance as the Edgeless Area. This tolerance is similar to SR_T1 and IR1_T1, with the difference that we increase or decrease the tolerance SR1_T2 proportionally to the local differences in luminance (the highest local luminance value less the lowest local luminance value, or LumHi−LumLo) because subtle luminance differences are less noticeable if there's large luminance differences in the area. We have found that (LumHi−LumLo)/4 works well, but it should be at least 10.

A third tolerance used in Inclusion Rule 1 (IR1_T3) Is used when to look for pixels that are lighter or darker than the Edgeless Area AvLum, and it assures that we don't look at pixels that are part of a different edge. In other words, LumHi and LumLo give us some idea of the darkest and lightest pixels that are connected or related to P2. If during Inclusion Rule 1 we encounter pixels that are dramatically different than LumHi/LumLo then we can conclude that they are part of a different edge and we will not consider them during Inclusion Rule 1. This tolerance varies proportionally to the local differences in luminance (LumHi−LumLo) because subtle luminance differences are less noticeable if there's large luminance differences in the area. A value of (LumHi−LumHi)/5 has been found to work well, provided that it should be at least 15.

A fourth tolerance (IR1_T4) is used when we're looking for pixels that are lighter or darker than the AvLum of P1, and it limits the number of lighter (or darker) pixels that we look at. Only a limited number of pixels need to be looked at in order to get an idea of the visual significance of these lighter (or darker) pixels. In other words, edges are detected locally. We have found a value of 15 works well. An alternative is to limit the pixels we'll look at to those within a specific radius (like 5) from P2. This has the same effect as IR1_T4. The concept is to calculate the significance of the potential edge locally.

A fifth tolerance is used in Inclusion Rules 1 and 2 designated IR1_T5. This tolerance gets used when we're looking for pixels that are lighter or darker than the AvLum of P1. Once a StrengthValue (described below) is determined, this tolerance is used to determine if the lighter (or darker) pixels constitute a visual edge. IR1_T5 was determined experimentally to ensure that a visible edge will have a StrengthValue greater than this threshold. For example, if P1 AvLum is 255 (white) and we have four neighboring pixels with values 200, the StrengthValue will be 4*(255−200)=220. This is very possibly a visual edge and should exceed IR1_T5. We find using a value of 140 normally works well.

This rule tests whether a selected pixel P2 outside of but contiguous to an edgeless area should be included into the edgeless area containing the pixel P1.

Figure 6:
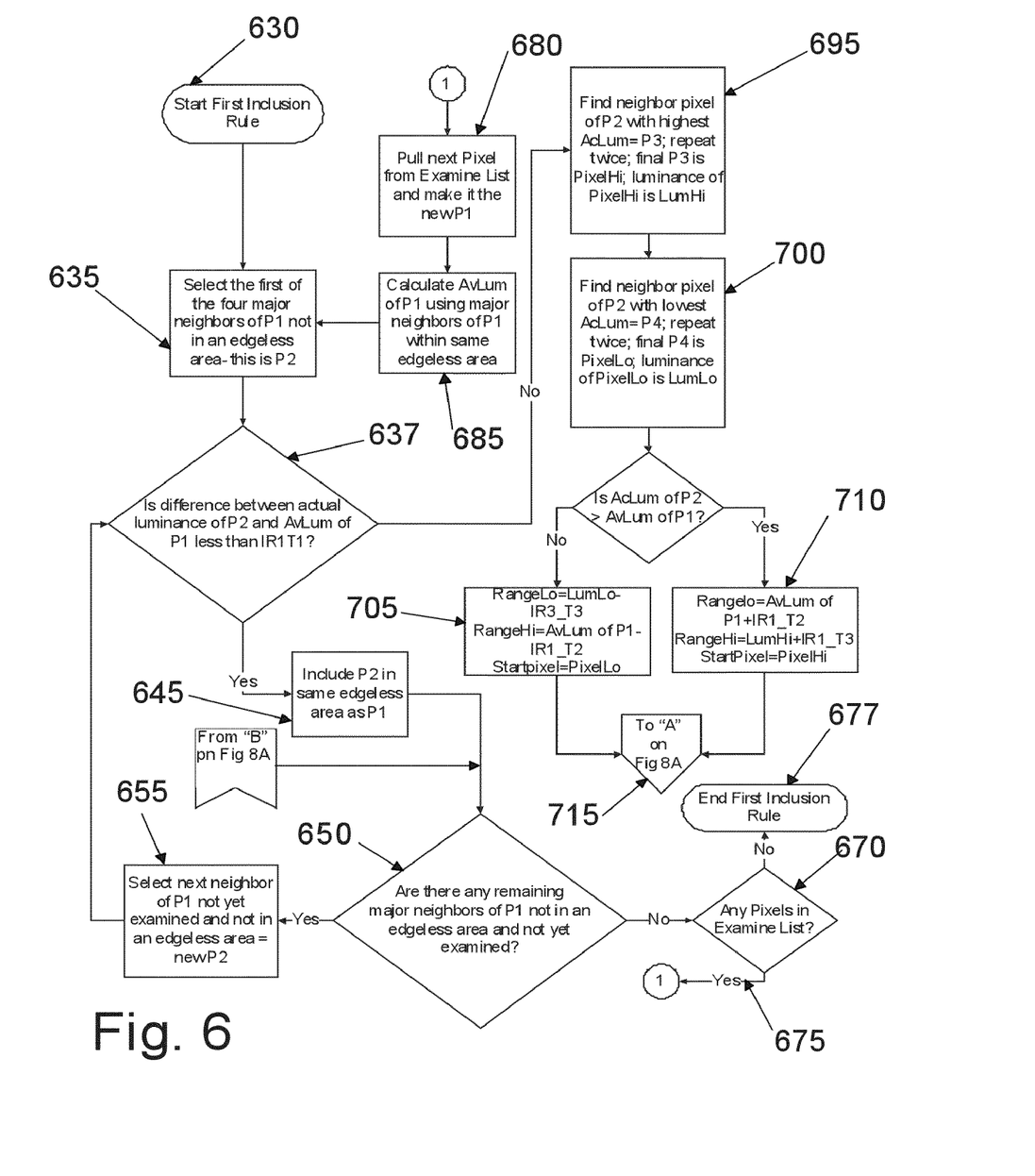
FIGS. 6 and 6A is a flowchart of one embodiment of a First Inclusion Rule.

Referring to FIG. 6, we begin at the start 630 and select the first of the major neighbors of P1 not in an edgeless area 635, our "P2" for the moment. If 637 the difference in actual luminance between P2 and the AvLum calculated for P1 is within a predefined tolerance IR1_T1 then include P2 in the edgeless area containing P1 645. We then determine if we have any remaining major neighbors of P1 to examine 650 and if so, take one of the unexamined major neighbors of P1 as our next P2 655 and repeat the examination process 637. If there are no unexamined major neighbors of P1 left to examine, we look to see if any Pixels are in an examine list 670 (created elsewhere) and if so, 675 pull off a pixel from the examine list and make it our new P1 680. We calculate the AvLum of P1 as defined above 685 and continue processing as before with the new P1 635. If there are no pixels remaining in the examine list, the first inclusion rule ends 677.

As the luminance values within an edgeless area cloud may drift gradually, contain noise and so forth, even if an examined pixel's luminance value caused it to be rejected for inclusion heretofore 637, the pixel may still be within the edgeless area. We can test further by looking in an area around our currently being tested pixel to see if neighboring pixels accentuate or negate the error introduced by the test pixel, or in other words, if the area is "noisy" and the variation in the luminance of the pixel being tested from its neighbors reflects the nosiness of the local area.

If in our examination of a major neighbor P2 of P1 the difference between the AvLum of P1 and the actual luminance of P2 is not within tolerance 690 we need to do further testing to see whether to include P2 in the edgeless area. We look at the major neighbors of P2 to find the one (PixelHi) with the highest actual luminance (AcLum) 695. We repeat this process two more times, each time looking at the major neighbors of the pixel with the highest actual luminance, finally deciding on the examined pixel with the highest actual luminance (LumHi) calling it PixelHi. We do the same thing again 700, beginning with our original P2, this time looking for the pixel (PixelLo) with the lowest actual luminance (LumLo). In shorter terms, we take a directed look within a radius of three pixels for the pixels with the highest and lowest luminance values, thus obtaining values for PixelHi, PixelLo, LumHi and LumLo.

If AcLum of P2 is less than AvLum of P1 705:
RangeLo=LumLo−IR_T3 705
RangeHi−AvLum of P1−IR1_T2
StartPixel is PixelLo
Otherwise 710,
RangeLo=AvLum of P1+IR1_T2
RangeHi=LumHi+IR1_T3
StartPixel is PixelHi.

Figure 6A:
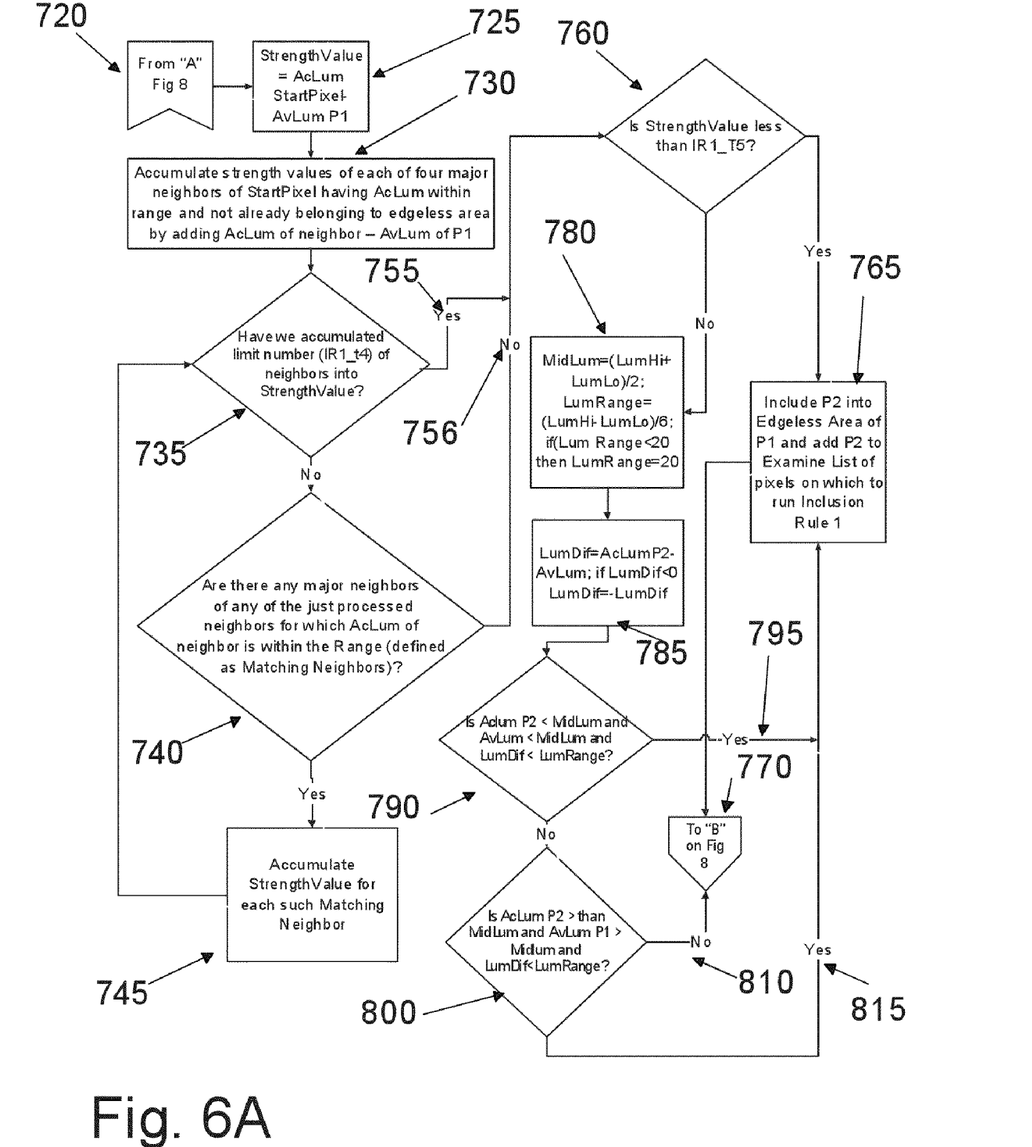

Turning to FIG. 6A (connector "A" 715 on FIG. 6 to Connector A 720 on FIG. 6A) we start 725 by assigning an initial StrengthValue equal to AcLum of StartPixel−AvLum of P1 which it will be recalled is the pixel whose neighbors are being examined to see if they also are in an edgeless area. Look 730 at the four major neighbors (up, left, right, down) of StartPixel which are not already in an edgeless area to see if any of them AcLums within the range (i.e. less than or equal to RangeHi and greater than or equal to RangeLo 730. For each such neighbor, accumulate to the StrengthValue AcLum of the neighbor−AvLum of P1 and keep a record of the neighbor and the change to StrengthValue it caused.

If we have not reached a preset limit of neighbors to be examined (IR1_T4) 735 see if there are any neighbors of any of the just processed neighbors for which the AcLum is within the range 740. If so, accumulate the strength values for each such neighbor as above 745, and go back to repeat the process at the start of this paragraph 735.

If we have reached the limit number of pixels to examine (IR1_T4) 755 or if there are no more major neighbors to examine 756, then if StrengthValue is less than a Threshold value IR1_T5 760 then 765 include P2 in the edgeless area, add P2 to the list of pixels to examine (the Examine List) by Inclusion Rule 1 765 and return 770 (to connector 680 on FIG. 6) to examine the next pixel in the Examine List. Turning again to FIG. 6, we pull the next pixel off the Examine List (there will always be at least one at this point) as our new P1 680, calculate the AvLum of P1, and repeat the First Inclusion Rule from the beginning If the StrengthValue is greater than the threshold value IR1_T5 then P2 is not included in the edgeless area at this time 780 (note that P1 is one of four immediate neighbors of P2. If the other immediate neighbors of P2 are part of edgeless areas then P2 will get looked at again, i.e. when those other neighbors are P1).

At this point 780 we have determined that P2 is possibly part of a visual edge, i.e. looking at P2 and its neighbors we found a significant difference in luminance compared to the luminance of the edgeless area containing P1.

However, even though P2 may be part of a visual edge, it might still visually belong to the edgeless area. For example, if the edgeless area was white (luminance 255), and the detected edge was black (luminance 0), then if P2 was luminance 225 we can include it in the white area because the eye will not detect the difference between 225 and 255 when there's black in the immediate vicinity.

This calculation is shown algorithmically in boxes 780, 785, 790 and 800 as follows: Calculate MidLum, i.e. the luminance halfway between LumLo and LumHi. Calculate LumRange, which indicates how close P2 must be to AvLum P1. LumRange can be bigger if the difference between LumHi and LumLo is great, and must be smaller if the difference between LumHi and LumLo is small. A value of (LumHi−LumLo)/6 has been found to work well (with a minimum of 20, i.e. LumRange will be 20 or greater).

Example 1: If LumHi is 255 and LumLo is 0 then LumRange=(255−0)/6=42.

Example 2: If LumHi is 128 and LumLo is 64 then LumRange=(128−64)/6=10, but the 20 minimum is applied so LumRange=20.

Next (785) we calculate LumDif, the absolute value of the luminance difference between AcLum P2 and AvLum P1.

Next (790, 800) if LumDif is less than LumRange AND AcLum P2 and AvLum P1 are both greater (or lesser) than MidLum then include P2 in P1 edgeless area. Otherwise, we cannot include P2 in P1 edgeless area at this time.

Example: Continuing our example from above, if LumHi is 255, LumLo is 0, MidLum will be 128 and LumRange will be 42. If AcLum P2 is 225 and AvLum P1 is 250, then LumDif will be 25. Box 790 will give a "no" result because AcLum P2 is not less than MidLum. Box 800 will give a "yes" result because AcLum P2 is greater than MidLum and AvLum P1 is greater than MidLum and LumDif is less than LumRange.

Optionally, improvement in detection of edgeless areas can be obtained by running a Second Inclusion Rule. This is a second approach for including potential edge pixel P2 into an edgeless area containing the pixel P1 (P1 is a neighbor of P2). P2 was looked at in the First Inclusion Rule but was not found to be within an edgeless area using the criteria of Inclusion Rule 1. Using the data calculated in the first inclusion Rule, particularly the Strength Value, we can perform an optional additional test—Inclusion Rule 2.

Figure 7:
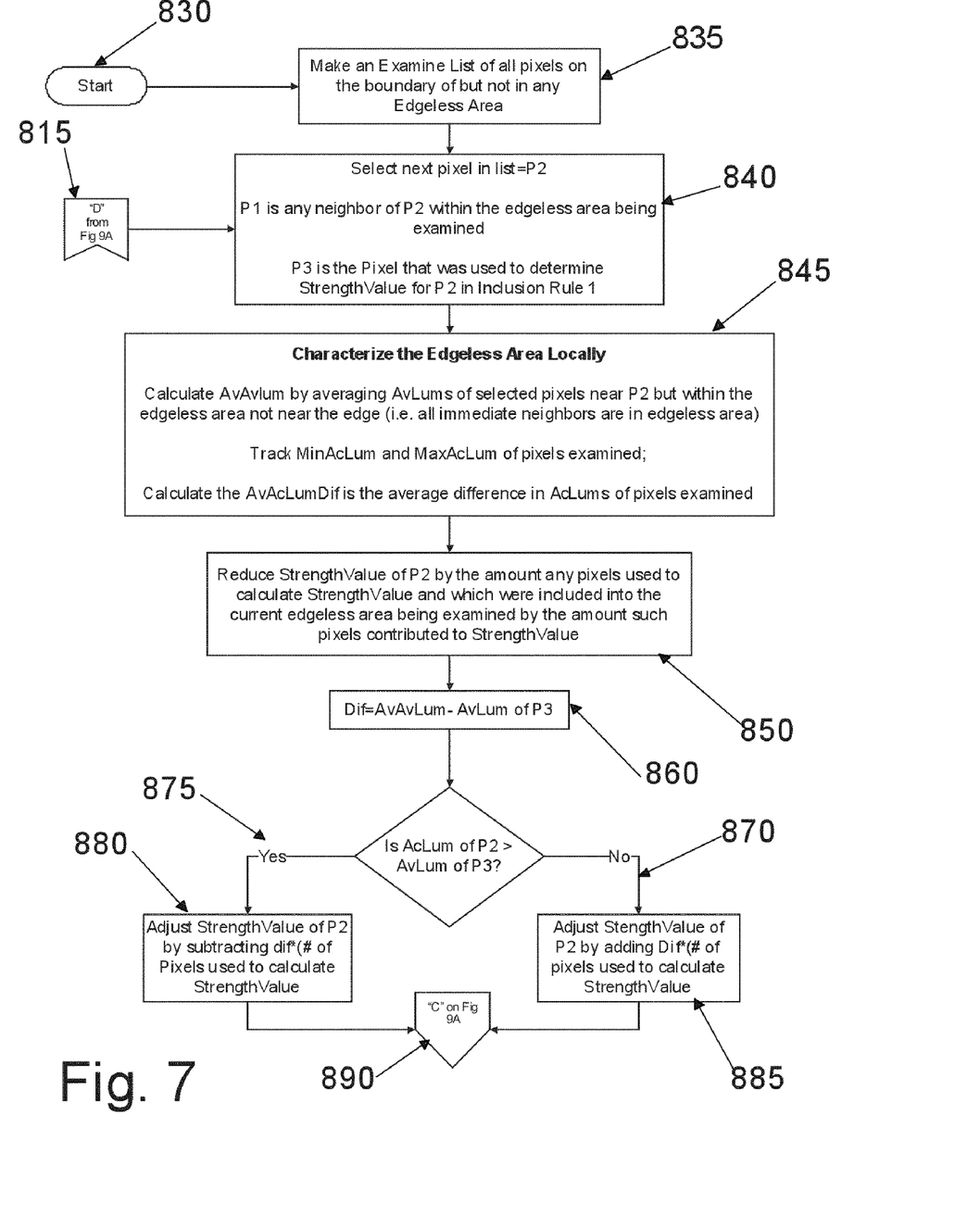
FIGS. 7 and 7A is a flowchart of one embodiment of a Second Inclusion Rule.

Referring to FIG. 7, we start 830 by making an examine list of all pixels on the boundary of but not in any edgeless area 835. Choose a first pixel from the examine list-P2. P1 is any neighbor of P2 within the edgeless area on which P2 borders.

P3 is the pixel that was used to determine the Strength Value of P2 during operation of Inclusion Rule 1 840.

Characterize the edgeless area locally 845 (approximately within ⅛" of P2 in a 150 dpi image) to determine the following:

AvAvLum equals the average of AvLums for pixels not near the edge of the edgeless area. In other words, AvLums for pixels whose 8 immediate neighbors are all part of the edgeless area and which lie within a ⅛ inch radius of P2. The AvLums for each pixel were calculated while running Inclusion Rule 1 and saved.

MinAcLum and MaxAcLum are, respectively, the minimum and maximum AcLums in the local area.

AvAcLumDif is the average difference in AcLum from pixel to pixel in the local portion of the edgeless area, i.e. the absolute value of the AcLum of a pixel minus the AcLum of a neighbor pixel. The differences are summed and then divided by the total number of measurements taken.

During Inclusion Rule 1 we calculated a StrengthValue for P2 and found it to be too great to include P2 in the edgeless area containing P1. We are now ready to adjust the StrengthValue calculated for P2 850 and try again as follows: if any pixels that were used to calculate the StrengthValue were included in an edgeless area containing P1, then reduce the StrengthValue by the amount that pixel contributed to the StrengthValue of P2 850. If the AvAvLum is closer to P2 AcLum than the P3 AvLum 875 used to calculate StrengthValue, reduce the StrengthValue by the absolute value of (AvAvLum−P1AvLum)*Numpix where Numpix equals the number of pixels that contributed to StrengthValue. If it's further away 870, increase the StrengthValue by the absolute value of (AvAvLum−P1 AvLum)*(number of pixels that contributed to StrengthValue) 885. Going to FIG. 7A (Connector 890 on FIG. 7 to Connector 900 on FIG. 7A) decrease the StrengthValue in proportion to the value (MaxAcLum−MinAcLum) 910 as described below. A large variation in min/max luminance suggests a noisy background that suggests edges must be stronger to be visible. We have found a good value of adjustment is ((MaxAcLum−MinAcLum)/12*(number of pixels that contributed to StrengthValue)/2.

Figure 7A:
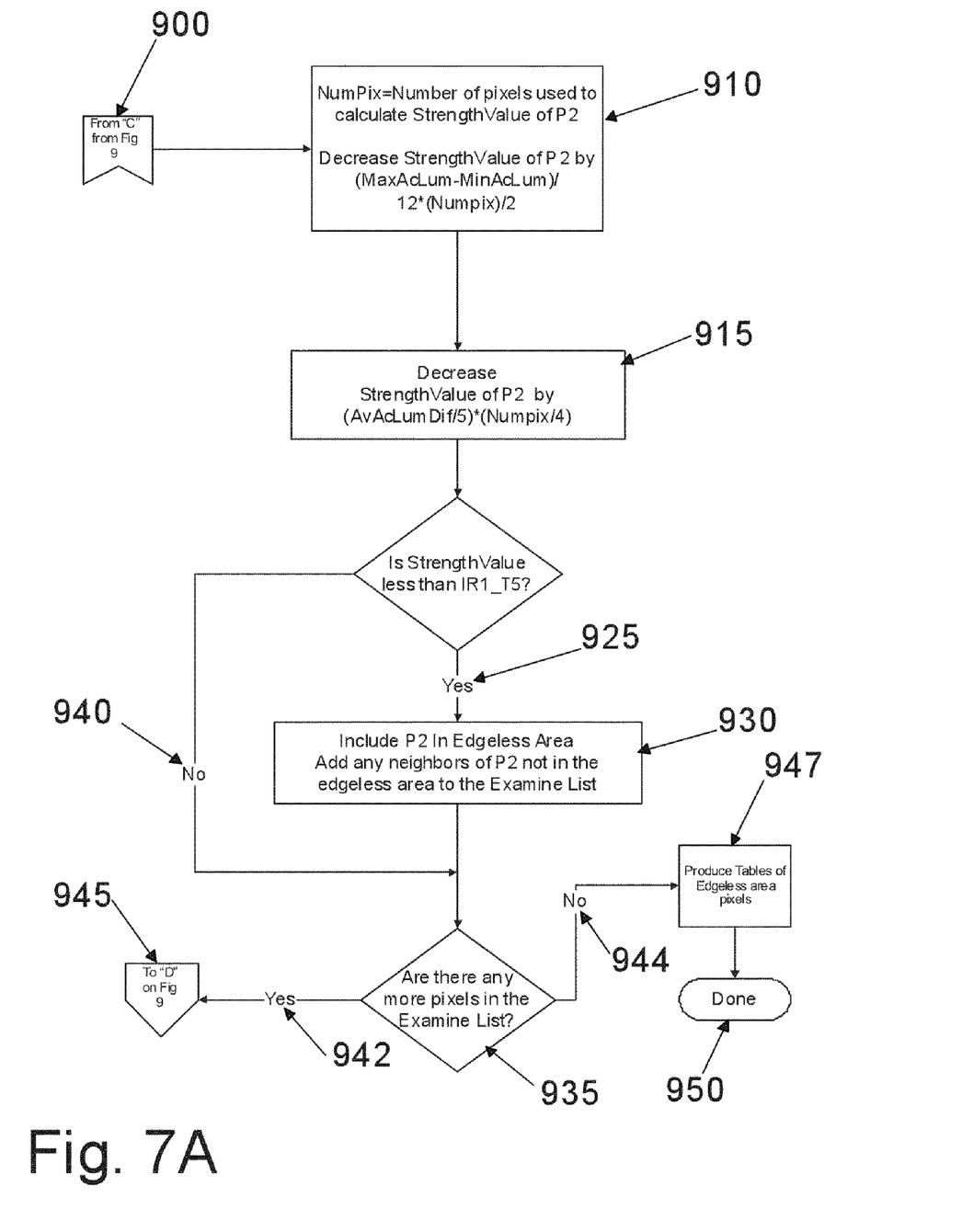

Decrease the StrengthValue in proportion to the value AvAcLumDif. A large variation in AvAcLumDif luminance suggests a noisy background that means edges must be stronger to be visible 915. Suggested value of adjustment is ((MaxAcLum−MinAcLum)/5*(number of pixels that contributed to StrengthValue)/4.

If the modified StrengthValue is less than IR1_T5 925 then include P2 in the edgeless area and add any neighbors of P2 not already in an edgeless area to the examine list 930.

If there are pixels remaining in the examine list, continue processing (945 connecting to 815 in FIG. 7) by selecting the next pixel in the examine list for processing 840. If there are no further pixels in the examine list 944 produce a table of pixels within edgeless areas 947 and we are done 950.

In summary, during Inclusion Rule 1 we decided that the error introduced by P2 and its neighbors was too great to allow P2 to be included in the edgeless area at that time. For Inclusion Rule 2 we gathered information about the edgeless area locally and used it to determine if we could include P2 after all. For example, P2 and its neighbors might constitute a visible edge for an edgeless area that is smooth and flat but will not constitute a visible edge for an edgeless area that is rough and noisy.

During the execution of inclusion rule 2 it is advisable to store information calculated about the edgeless area to avoid redundant calculations. For example, pixels of an edgeless area within ⅛" of each other might all refer to a single table containing the values AvAvLum, MinAcLum, MaxAcLum and AvAcLumDif.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD or DVD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Nevertheless, it will be understood that various modifications may be made without departing from the spirit and scope of the invention. Other embodiments are within the scope of the following claims. For example, the steps of the invention can be performed in a different order and still achieve desirable results. The invention is applicable to other than image processing, such as location of areas in a visual field not containing objects having discernable edges. The embodiments described are but one way of implementing the principles of the present invention, and other embodiments may be utilized to implement the principles of the present invention. Accordingly, other embodiments are within the scope of the following claims.

The invention claimed is:

1. A computer program product, tangibly stored on a computer-readable medium, for finding edgeless areas in a digital image, comprising instructions operable to cause a programmable processor to:
   select from a digital image an unexamined pixel from said digital image P1 not already in an edgeless area;
   using a start rule luminance tolerance, if the range of luminance values of the major neighbors of the selected pixel is less than said start rule tolerance, calculate the average luminance of p1 with its immediate neighbors and begin an edgeless area with P1
   run a first inclusion rule to attempt expansion of said edgeless area if possible; repeat the preceding steps until there are no more unexamined pixels not in an edgeless area;
   using a first inclusion rule tolerance IR1_T1, and a second first inclusion rule tolerance IR1_T2 include the major neighbors of P1 within an edgeless area containing P1 for which the difference between the actual luminance of said the major neighbor of P1 and the AvLum and P1 is less than IR1_T1;
   for any major neighbors of P1 which do not satisfy the preceding criterion, examine the local variation in luminance surrounding P1; calculating a strength value for each major neighbor of P; and if said variation is greater than said IR1_T2, including within said edgeless area containing P1 said major neighbors for which said local variation is greater than IR1_T2;
   repeat the foregoing steps of said first inclusion rule for each pixel added to said edgeless area by operation of said first inclusion rule;
   produce a table of pixels within said digital image which are within at least one edgeless area.

2. The computer program product of claim 1 further comprising the steps of: make an examine list of all pixels on the boundary of said edgeless area containing P1 but not already in an edgeless area;
   select a pixel P2 from said examine list, calculating the AvLum of pixels near said P2 but within said edgeless area, and tracking the MinAcLum and MaxAcLum of each nearby pixel so examined;
   reduce the said strength value of said P2 by the amount contributed to said strength value of P2 by any pixels which were included in said edgeless area;
   further adjust the strength value of P2 in relation to the difference between the AcLum of said P2 and the AvLum of said P3;
   using a first proportionality constant, further decrease the said strength value of P2 in proportion to MaxAcLum-MinAcLum divided by said first proportionality constant multiplied by Numpix,
   using a second and a third proportionality constant;
further decrease said strength value of said P2 by AvAcLum-Dif divided by said second proportionality constant, all multiplied by said NumPix divided by said third proportionality constant;
   for such pixel P2 for which the resulting strength value is less than IR1_t5, including said pixel P2 within said edgeless area and adding an neighbors of said P2 not already within an edgeless area to said examine list;
   repeat the foregoing steps for each pixel within said examine list until the foregoing steps have been applied to all pixels within said examine list.

3. A method for finding edgeless areas in a digital image, comprising:
- selecting from a digital image an unexamined pixel P1 not already in an edgeless area of said digital image;
- providing a start rule luminance tolerance;
- calculating the average luminance of p1 with its immediate neighbors and begin an edgeless area with P1 where the range of luminance values of the major neighbors of the selected pixel P1 is less than said start rule tolerance;
- using a first inclusion rule tolerance IR1_T1, and a second first inclusion rule tolerance IR1_T2;
- including the major neighbors of P1 within an edgeless area containing P1 for which the difference between the actual luminance of said the major neighbor of P1 and the AvLum and P1 is less than IR1_T1;
- for any major neighbors of P1 which do not satisfy the preceding criterion, examining the local variation in luminance surrounding P1; calculating a strength value for each major neighbor of P; and if said variation is greater than said IR1_T2, including within said edgeless area containing P1; said major neighbors for which said local variation is greater than IR1_T2; repeating the foregoing steps of said first inclusion rule for each pixel added to said edgeless area by operation of said first inclusion rule;
- producing a table of pixels within said digital image which pixels are within at least one edgeless area.

4. The method of claim 3 further comprising the steps of:
- making an examine list of all pixels on the boundary of said edgeless area containing P1 but not already in an edgeless area;
- selecting a pixel P2 from said examine list, calculating the AvLum of pixels near said P2 but within said edgeless area, and tracking the MinAcLum and MaxAcLum of each nearby pixel so examined;
- reducing the said strength value of said P2 by the amount contributed to said strength value of P2 by any pixels which were included in said edgeless area;
- further adjusting the strength value of P2 in relation to the difference between the AcLum of said P2 and the AvLum of said P3;
- using a first proportionality constant, further decreasing the said strength value of P2 in proportion to MaxAcLum-MinAcLum divided by said first proportionality constant multiplied by Numpix,
- using a second and a third proportionality constant, further decreasing said strength value of said P2 by AvAcLum-Dif divided by said second proportionality constant, all multiplied by said NumPix divided by said third proportionality constant;
- for such pixel P2 for which the resulting strength value is less than IR1_t5, including said pixel P2 within said edgeless area and adding an neighbors of said P2 not already within an edgeless area to said examine list;
- repeating the foregoing steps for each pixel within said examine list until the foregoing steps have been applied to all pixels within said examine list.

* * * * *